July 17, 1928. 1,677,287
R. E. NAUMBURG
APPARATUS FOR ADJUSTING AUTOMOBILE CURTAINS
Filed May 13, 1927
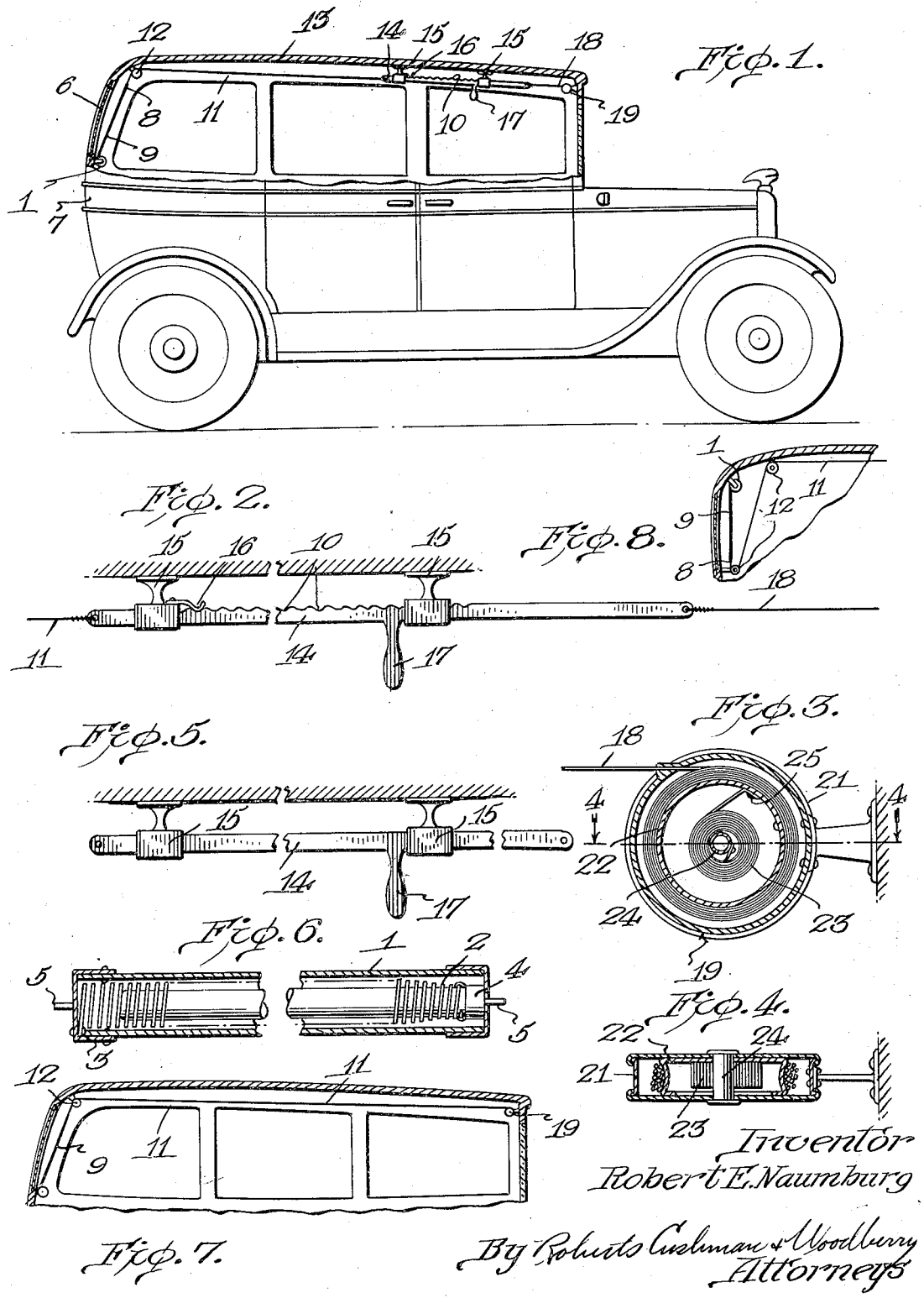
Inventor
Robert E. Naumburg
By Roberts Cushman & Woodberry
Attorneys Patented July 17, 1928.

1,677,287

UNITED STATES PATENT OFFICE.

ROBERT E. NAUMBURG, OF WINCHESTER, MASSACHUSETTS.

APPARATUS FOR ADJUSTING AUTOMOBILE CURTAINS.

Application filed May 13, 1927. Serial No. 191,118.

This invention relates to shade curtains for the rear windows of automobiles or the like which may be positively adjusted by an operator located at a distance therefrom.

It is frequently necessary or desirable for the driver of an automobile to have the shade upon the rear window of his car adjusted—either to shut out the glare from the headlights of cars following, or to permit the operator to see what is behind him as when backing the car. As is well known, such adjustment is impracticable for the driver in any automobile, especially in those having a rear seat, in which case the distance positively prevents him from reaching the curtain. But in other cars also it is necessary for him to turn around, and this distracts his attention from the road in front in order to manipulate the curtain which is not only awkward but dangerous.

It is accordingly an object of this invention to provide means for the ready adjustment of shade curtains from a point removed from the curtain, and to positively control the same as may be desired. Other objects will appear from the following disclosure and claims.

The invention includes the provision of a gathering means such as a spring roller which tends to gather or roll up the curtain thereon, a cord or other extended guiding member attached to the free end of the curtain and leading to the point from which the curtain is to be operated and a tension device attached to the cord and drawing upon the cord in opposition to the gathering means, such as a spring-actuated reel or pulley. There may also be provided a control or stop, operable upon the cord to adjust and to retain the same in any given position against the action of the gathering means and the tension device.

A specific embodiment of the invention, as applied to the rear curtain of an automobile, is illustrated in the accompanying drawings, in which Fig. 1 is a side elevation of a closed automobile showing the device installed therein;

Fig. 2 is a detail side view of a preferred form of adjusting and stop mechanism;

Fig. 3 is a sectional view of the tension device or reel having a coiled tension spring therein;

Fig. 4 is a transverse section along line 4—4 of Fig. 3;

Fig. 5 is a side view of a modified form of adjusting and stop mechanism;

Fig. 6 is a longitudinal section of the curtain roller; and

Fig. 7 is a side elevation (with parts broken away) of a closed automobile showing the apparatus installed therein, without a positive stop mechanism.

Fig. 8 shows a modified application of the invention in which the curtain roller is positioned above the window.

In the drawings (Figs. 1 to 6) the curtain roller 1, having an internal helical spring 2 fastened to the roller at one end 3, and at its opposite end to the hub 4, is mounted by means of pins 5 across the lower edge of the rear window 6 in the automobile 7 (Fig. 1). The free edge 8 of the curtain 9 is attached to the cord 11, which passes over pulleys or other guides 12 fixed to the inside of the automobile roof 13, and is connected to one end of a rack bar 14. The rack bar is slidably mounted in fixture 15 and is provided with a row of teeth 10 engaging a spring pressed stop member 16. On the lower side of the rack bar is provided a handle 17, while the opposite end is connected to a second cord 18 leading to a take-up reel 19. This latter is mounted on the inside of the forward part of the roof and includes an outer casing 21 (Fig. 3), a pulley or reel 22 having an internal, spiral spring 23, one end of which is attached to the hub 24 and the other to the reel as at 25.

As arranged in Fig. 1, when it is desired to cover the rear window the handle 17 is grasped by the operator and drawn forward. This pulls the cord 11 forward and raises the curtain 9 against the tension of spring 2 which is thereby coiled up due to the rotation of roller 1, as the curtain unrolls. At the same time spring catch 16 rides over the rack bar and locks the same in place when the handle is released. Thus, the curtain is retained in raised position, The cord 18 is simultaneously coiled up on reel 22 by retraction of spring 23. To lower the shade curtain, the handle 17 is thrust backwardly. The catch 16 rides over the bar 14, the curtain 9 is gathered or rolled up on the roller 1, which is revolved by the retraction of spring 2, and the cord 18 is drawn out from reel 22, thus coiling up the tension spring 23. When the handle is released, the spring 16 continues to hold the bar 14 firmly in position.

The device illustrated in Fig. 5 is similarly operated, the bar 14 being retained by friction in the holders 15, in any position of adjustment in which it may be left after positive actuation by means of the handle 17.

In Fig. 7 a modification of the device is shown similar to that in Fig. 1, in which the cord 11 extends directly from the curtain 9 to the reel 19. In this arrangement the tensions of the springs 2 and 23 are preferably substantially balanced, so that the friction of the guides 12 is sufficient to prevent either from moving the other, per se, or due to vibration of the car.

The spring 2 in the roller 1 and the spring 23 in the reel 21 may be so made as to be substantially equal in the degree of tension which they exert upon the cord, and the stop mechanism may be dispensed with and the cord 11 may lead directly to the take-up reel 21, as shown in Fig. 7. In this case the curtain is operated by pulling the cord 11 forward and back in the described manner. The friction of the cord over pulley 12 or upon entering the guide of the reel 21, may be sufficient to offset slight differences in tension which occur incidentally.

As shown in Fig. 8 the curtain roller 1 is mounted above the window and the curtain 9 is drawn downwardly therefrom to cover the window. The cord 11 is fastened to the lower edge 8 and passes over the two friction guides 12, 12 instead of one, as in Fig. 1. These guides restrain the movement of the cord or of the curtain. The roller 1 may be provided with a locking pawl and ratchet (in the well known manner) to retain the curtain in any adjusted position, or the curtain may be retained by the friction between the cord 11 and guides 12. The reel 19 will gather up the slack cord in either case and hold it in a substantially horizontal line along the top of the car and in position for convenient manipulation.

By means of the present invention the curtain may be easily and positively adjusted by the driver without even turning his head and without the least delay in having it effected. Obviously the device may be largely concealed in the roof of the car if desired, or attached to the inner side of the roof or along the side wall of the car above the doors and windows. The several elements of the device may be modified or substituted by other equivalent forms of mechanism, within the invention, and may be disposed in various ways to conform to the other features of construction where it is to be installed. Other uses and adaptations of the invention are likewise to be considered as comprehended by the following claims.

I claim:

1. Apparatus for adjusting window curtains and the like comprising a stationary curtain roller, a cord roller, a cord having its opposite ends attached to the cord roller and the curtain respectively, take-up springs oppositely connected with the rollers respectively to hold the cord and curtain taut, the cord roller spring tending to unwind the curtain from the curtain roller, and means having sufficient friction to hold the cord and curtain in adjusted position against the unbalanced increment of spring action.

2. Apparatus for adjusting window curtains and the like comprising a curtain roller, a cord roller, a cord having its opposite ends attached to the cord roller and the free end of the curtain respectively, approximately balanced take-up springs oppositely connected with the rollers respectively to hold the cord and curtain taut, the cord roller spring tending to unwind the curtain from the curtain roller, and means having sufficient friction to hold the cord and curtain in adjusted position against the unbalanced increment of spring action, said means including guides associated with the cord intermediate the rollers.

3. Apparatus for adjusting window curtains and the like comprising a stationary curtain roller, a stationary cord roller, a cord having its opposite ends attached to the cord roller and the free end of the curtain respectively, approximately balanced take-up springs oppositely connected with the rollers respectively to hold the cord and curtain taut, the cord roller spring tending to unwind the curtain from the curtain roller, and means having sufficient friction to hold the cord and curtain in adjusted position against the unbalanced increment of spring action, said means including means associated with the cord intermediate the rollers, each roller being free to rotate in either direction at all times whereby the curtain may be adjusted from any position to any other position by a single pull on the cord.

4. Apparatus for adjusting the rear window curtain of an automobile comprising a curtain roller at the rear window, a cord roller in the region of the driver's position, a cord having its opposite ends attached to the free end of the curtain and the cord roller respectively and extending near the ceiling, approximately balanced take-up springs oppositely connected with the rollers respectively to hold the cord and curtain taut, the cord roller spring tending to unwind the curtain from the curtain roller, and means having sufficient friction to hold the cord and curtain in adjusted position against the unbalanced increment of spring action, whereby the curtain may be adjusted from either the front or rear of the automobile.

Signed by me at Boston, Massachusetts, this 5th day of May, 1927.

ROBERT E. NAUMBURG.